United States Patent
Moore et al.

(10) Patent No.: US 7,827,498 B2
(45) Date of Patent: Nov. 2, 2010

(54) METHOD AND SYSTEM FOR DYNAMIC INTERACTIVE DISPLAY OF DIGITAL IMAGES

(75) Inventors: Michael R. Moore, Folsom, CA (US); Daniel A. Kaye, Folsom, CA (US); Kenneth A. Turcotte, Folsom, CA (US); Randy J. Jongens, Folsom, CA (US); Michael D. Wang-Helmke, Carmichael, CA (US); Peter A. Tjeerdsma, Fair Oaks, CA (US); Paul E. Greaves, Granite Bay, CA (US); Christopher H. Davey, Sacramento, CA (US); Daniel N. Sashko, Roseville, CA (US); Curtis J. Fritzsche, Sacramento, CA (US); Debbie D. English-Deason, Folsom, CA (US)

(73) Assignee: Visan Industries

( * ) Notice: Subject to any disclaimer, the term of this patent is extended or adjusted under 35 U.S.C. 154(b) by 901 days.

(21) Appl. No.: 11/197,474

(22) Filed: Aug. 3, 2005

(65) Prior Publication Data

US 2006/0036949 A1    Feb. 16, 2006

Related U.S. Application Data

(60) Provisional application No. 60/598,883, filed on Aug. 3, 2004.

(51) Int. Cl.
*G06F 3/00* (2006.01)
(52) U.S. Cl. .................................. 715/760; 715/741
(58) Field of Classification Search .................. 715/760

See application file for complete search history.

(56) References Cited

U.S. PATENT DOCUMENTS

| | | | |
|---|---|---|---|
| 4,239,376 A | 12/1980 | Wyller | |
| 5,465,213 A | 11/1995 | Ross | |
| 6,028,603 A * | 2/2000 | Wang et al. | 715/776 |
| 6,389,181 B2 | 5/2002 | Shaffer et al. | |
| 6,389,467 B1 | 5/2002 | Eyal | |
| 6,392,665 B1 | 5/2002 | Argabright et al. | |
| 6,453,078 B2 * | 9/2002 | Bubie et al. | 382/305 |
| 6,542,950 B1 * | 4/2003 | Bodnar | 710/260 |
| 6,549,922 B1 | 4/2003 | Srivastava et al. | |
| 6,587,596 B1 * | 7/2003 | Haeberli | 382/283 |
| 6,606,411 B1 | 8/2003 | Loui et al. | |
| 6,636,648 B2 | 10/2003 | Loui et al. | |
| 6,704,733 B2 | 3/2004 | Clark et al. | |

(Continued)

OTHER PUBLICATIONS

RocketLife Frequently Asked Questions, Feb. 2004, pp. 1-3.*

(Continued)

*Primary Examiner*—William L Bashore
*Assistant Examiner*—David Phantana-angkool
(74) *Attorney, Agent, or Firm*—Carr & Ferrell LLP

(57) ABSTRACT

A method and system for the dynamic interactive display of digital images, comprising client and server applications working together over the Internet or over other similar modes of digital data transmission to collect, store, select, present, distribute and manage information for digital images, including photographs, pictures, videos, movies and other forms of digital media. The present invention achieves these functions through user-friendly dynamic interactive graphical user interfaces that are readily accessible over the Internet from a wide variety of devices used for digital communication.

34 Claims, 4 Drawing Sheets

U.S. PATENT DOCUMENTS

| | | | |
|---|---|---|---|
| 6,865,297 B2 | 3/2005 | Loui et al. | |
| 7,003,214 B2 | 2/2006 | Ando et al. | |
| 7,062,722 B1* | 6/2006 | Carlin et al. | 715/850 |
| 7,076,469 B2* | 7/2006 | Schreiber et al. | 705/57 |
| 7,146,575 B2* | 12/2006 | Manolis et al. | 715/838 |
| 7,197,531 B2* | 3/2007 | Anderson | 709/203 |
| 7,230,628 B1 | 6/2007 | Haeberli | |
| 7,236,258 B2* | 6/2007 | Wen et al. | 358/1.12 |
| 7,243,079 B1* | 7/2007 | Manolis et al. | 705/27 |
| 7,266,782 B2* | 9/2007 | Hull et al. | 715/838 |
| 7,269,800 B2* | 9/2007 | Manolis et al. | 715/838 |
| 7,432,936 B2 | 10/2008 | Woodbury, Jr. | |
| 7,512,698 B1* | 3/2009 | Pawson | 709/231 |
| 2001/0005837 A1* | 6/2001 | Kojo | 705/51 |
| 2002/0000998 A1 | 1/2002 | Scott et al. | |
| 2002/0099696 A1 | 7/2002 | Prince | |
| 2002/0099731 A1 | 7/2002 | Abajian | |
| 2002/0194195 A1* | 12/2002 | Fenton et al. | 707/104.1 |
| 2003/0009469 A1 | 1/2003 | Platt et al. | |
| 2003/0052909 A1 | 3/2003 | Mo et al. | |
| 2003/0144961 A1 | 7/2003 | Tharaken et al. | |
| 2003/0182402 A1 | 9/2003 | Goodman et al. | |
| 2003/0233422 A1* | 12/2003 | Csaszar et al. | 709/206 |
| 2004/0012513 A1* | 1/2004 | Van Schendel et al. | 341/138 |
| 2004/0017390 A1 | 1/2004 | Knowlton et al. | |
| 2004/0019608 A1 | 1/2004 | Obrador | |
| 2004/0039834 A1* | 2/2004 | Saunders et al. | 709/231 |
| 2004/0090468 A1 | 5/2004 | Cruikshank et al. | |
| 2004/0125130 A1* | 7/2004 | Flamini et al. | 345/738 |
| 2004/0160624 A1 | 8/2004 | Elgar et al. | |
| 2004/0199507 A1 | 10/2004 | Tawa, Jr. | |
| 2004/0250205 A1* | 12/2004 | Conning | 715/517 |
| 2005/0071781 A1 | 3/2005 | Atkins | |
| 2005/0102624 A1 | 5/2005 | McIntyre | |
| 2005/0123892 A1 | 6/2005 | Cornelius et al. | |
| 2005/0157330 A1 | 7/2005 | Giuliano | |
| 2005/0165795 A1 | 7/2005 | Myka et al. | |
| 2005/0210413 A1 | 9/2005 | Quek et al. | |
| 2005/0273701 A1 | 12/2005 | Emerson et al. | |
| 2006/0037053 A1* | 2/2006 | McDowell et al. | 725/80 |
| 2006/0168542 A1 | 7/2006 | Abanami et al. | |
| 2007/0074110 A1 | 3/2007 | Miksovsky et al. | |
| 2007/0106690 A1 | 5/2007 | Denniston et al. | |

OTHER PUBLICATIONS

Miser Brad; Special Edition Using® Mac® OS X v10.2; Pub Date: Jan. 3, 2003; Ch. Creating and Editing Digital Images > Using iPhoto to Master Digital Images (1-28 of printout).*

Macromedia Captivate 1.0: Using Captivate, user guide [online], Macromedia Inc., Apr. 2005, especially pp. 17-57 and 215-220.

Breeze 5 Integration Guide, user guide [online], Macromedia, Inc., May 2005.

Brreze 5 Integration Guide, user guide [online], Macromedia, Inc. May 2005.

RealNetworks, http://www.service.real.com/help/library/guide/ProductionGuide/proguide/htmfiles/server.htm#69551, 2004, Chapter 21.

Inigo Surguy, "Client-side image generation with SVG and XSLT," http://web.archive.org/web/20040219193956/http://surguy.net/articles/client-side-svg.xml, Feb. 2004.

San Francisco State University, "Mac OS The desktop Operating System for Macintosh computers," http://www.sfsu.edu/~training/mac%20os.pdf, Mar. 2004.

* cited by examiner

METHOD AND SYSTEM FOR DYNAMIC INTERACTIVE DISPLAY OF DIGITAL IMAGES

CROSS-REFERENCE TO RELATED APPLICATIONS

The present application claims the benefit and priority of U.S. Provisional Patent Application Ser. No. 60/598,883, filed on Aug. 3, 2004 and entitled "Method and System for Dynamic Interactive Display of Digital Images," which is herein incorporated by reference.

BACKGROUND OF THE INVENTION

1. Field of the Invention

This invention relates generally to the dynamic interactive display of digital images, and particularly to dynamic interactive graphical user interfaces for producing displays and presentations of digital images.

2. Description of Related Art

Devices capable of capturing digital images are in widespread use and are continuing to grow in popularity. One such device, the digital camera, has become extremely popular, especially those digital cameras that form an integral part of other types of digital communication devices such as cell phones and PDAs. The direct result of this development is the proliferation of digital images.

Simultaneous with the proliferation of digital images is the advent of the Internet, with email and large amounts of digital data burdening digital transmission modes, computing power and data storage. These factors have resulted in the need for user-friendly and efficient ways for digital images to be collected, stored, accessed, presented and distributed.

Prior art approaches to the collection, storage, accessing, presentation and/or distribution of digital images include the use of File Transfer Protocol ("FTP") between a server and a manually created web page, often combined with a static or dynamic HTML web page presentation. This approach requires substantial programming expertise and is difficult to adapt to a wide variety of user environments. Online photo sharing services represent another prior art approach that offers limited presentation options with little or no means for user interactivity. Another prior art approach, commonly known as snapshot "blogging" on websites located on the World Wide Web, offers limited presentation options and user interactivity is limited to user comments and uploads.

SUMMARY OF THE INVENTION

The present invention provides a method and system for the dynamic interactive display of digital images. A client user with a dynamic interactive graphical user interface uploads a digital image to a server. The client user with another dynamic interactive graphical user interface selects more than one digital image from the server, including the uploaded digital image. The client user utilizes the same dynamic interactive graphical user interface to create a display featuring the selected digital images. The client user may then use the dynamic interactive graphical user interface to add music to the display of the selected digital images. Finally, the client user with a third dynamic interactive graphical user interface can create one or more channels to display selected digital images and music for their own enjoyment or for sharing with one or more other clients.

The present invention is also directed to a server configured for the uploading of a digital image from a client. The server is configured for the selection by the client of more than one digital image, including the uploaded digital image. The server is configured for the creation of a display featuring the selected digital images, including for the addition of music. Finally, the server is configured to allow channeling by the client of the selected digital images to at least one other client.

Other features and advantages of the present invention will be apparent in view of the following detailed description and exemplary embodiments.

DETAILED DESCRIPTION OF THE INVENTION

Figure 1:
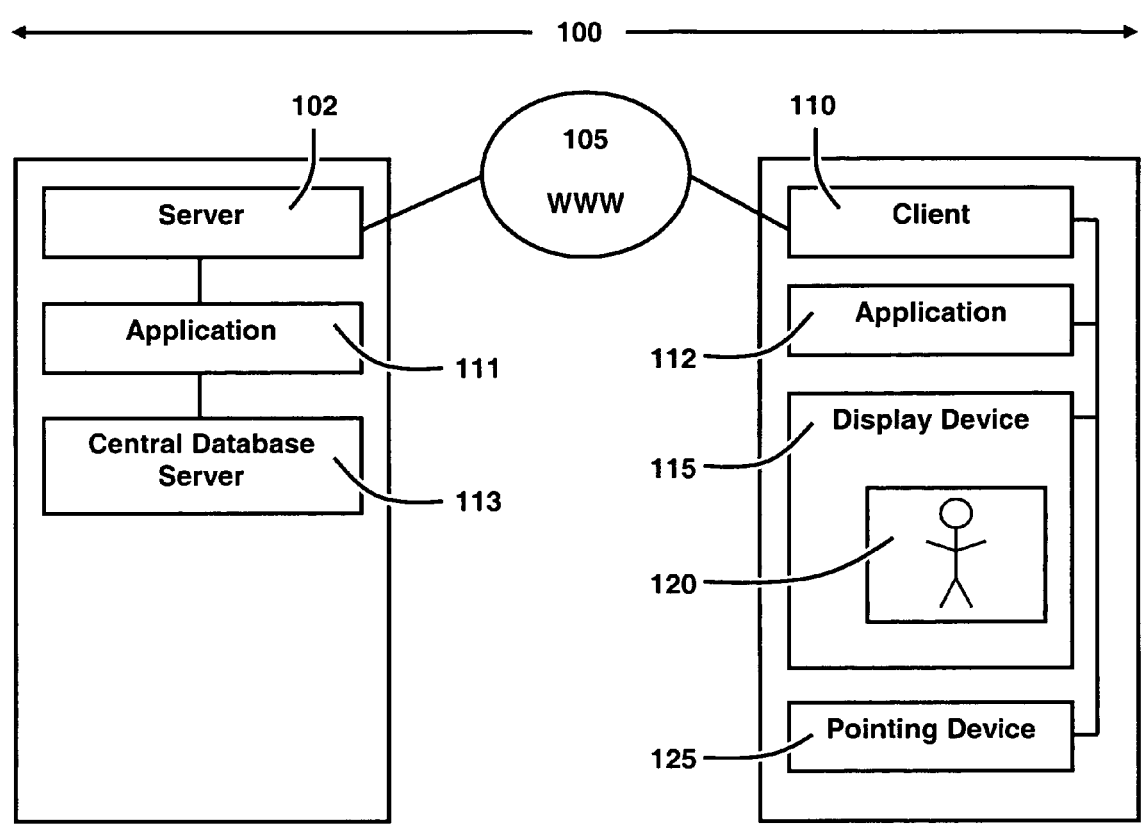
FIG. 1 illustrates a simplified architecture in which the present invention can operate.

FIG. 1 shows a simplified architecture 100 in which exemplary embodiments of the present invention can operate.

The architecture 100 comprises a server 102, connected to the client 110 by a network 105. The server 102 can be an Internet accessible server, such as an Apache or Microsoft IIS. Although FIG. 1 shows only one client and one server, it should be understood that typical embodiments of the present invention can have numerous clients and one or more servers. In this exemplary embodiment, the network 105 is a global internetwork of networks known as the "Internet," which includes the World Wide Web.

In exemplary embodiments, the client 110 is a personal computer with a display device 115 for displaying a digital image 120, and a mouse, cursor, buttons, touch screen or other pointing or selection device 125. Clients can include computers, personal computers, cellular phones, DVD players, CD players and PDAs. Digital images can include audio, video, pictorial, photographic and text files and all variations and combinations thereof that are at least partially digitally encoded. Additionally, the client 110 can be operated by one or more human users, collectively referred to herein as the "client user."

In exemplary embodiments, the operation of the server 102 and the client 110 is coordinated by a client-server application 111-112. Connection checks can be performed at periodic intervals to verify communication between the server 102 and the client 110. In the event of a disruption between the server 102 and the client 110, communication can be reestablished by the client 110 initiating a new connection to the server 102.

In exemplary embodiments, when a new client 110 accesses the server 102 over the Internet or network 105, the client 110 is directed to download the client application 112. The client application 112 can be implemented as an HTML web page with software implemented in Javascript™ or similar language and for certain features to also incorporate a Java™ application, Active-X™ control, or other similar application capable of running on the operating systems of most clients.

In exemplary embodiments, the client application 112 communicates with the server 102 by using a specific set of commands pertaining to functions such as the timing of client requests for digital images from the server, the posting of a vote by a client user for a particular digital image, the banning of a digital image from future display on a display device 115, the uploading of a new digital image from a client 110 to the server 102 and/or the requesting by a client 110 of information or metadata about a particular digital image 120 from the server 102.

In exemplary embodiments, an example of the specific set of commands used by the client application 112 to communicate with the server 102 occurs when the client 110 initially requests to display from the server 102 the digital images presently being displayed by the server 102 to other clients. On subsequent requests by the client 110 to display from the server 102 the digital images being displayed to other clients, the server 102 will send to the client 110 the digital images displayed since the previous client 110 request for digital images from the server 102, including the digital images presently being displayed by the server 102 to other clients. In the event the client 110 missed an update of digital images from the server 102, the client 110 will have the digital images previously displayed by the server 102 to other clients.

In exemplary embodiments, the client 110 can run on its own, with timing paced by the server 102. The speed in which a digital image is requested from the server 102 and displayed by the display device 115 of the client 110 is synchronized by a feedback mechanism. This feedback mechanism allows the server 102 to function with a growing number of clients by the server 102 instructing clients how often to make future digital images requests from the server 102.

In exemplary embodiments, data transmission between the server 102 and the client 110 is minimized by a synchronization and control mechanism. This synchronization and control mechanism can be implemented in Javascript™ or some other programming language. A message sent by the server 102 to the client 110 encodes the information required to control both the communication rate and the information required to display a particular digital image.

In exemplary embodiments, when a client 110 requests from the server 102 a digital image for display, the server 102 will respond with the requested digital image. Alternatively, the server 102 may respond with other featured digital images, based on the popularity of the featured digital images with other client users. The size of the digital image 120 displayed on the display device 115 may be larger or smaller than other digital images displayed, due to the popularity of the particular digital image with other client users. Additionally, the placement of the digital image in a grid presentation of digital images 205 (FIG. 2) may be determined by the server 102.

In exemplary embodiments, operation between the server 102 and the client 110 allows for resolution independence. Resolution independence is characterized by the client 110 being able to request and display different resolutions of digital images 120 from the server 102. Displays on the display device 115 of the client 110 can occur automatically, based on the detection by the server 102 of such parameters as the Internet bandwidth, client display device size and/or client CPU speed. Accordingly, an uploaded digital image taken with a digital camera having a resolution larger than that of the display device 115 can be scaled and filtered to a smaller size by the server 102 either before or after the digital image is uploaded to the server 102. Alternatively, a digital image can be scaled and filtered on demand by the client user at the cost of additional server resources. Additionally, the client 110 can be provided with a dynamic interactive graphical user interface with manual controls for the client user to select a resolution preference for a particular digital image, category of digital images or digital images from a particular provider.

Figure 6:
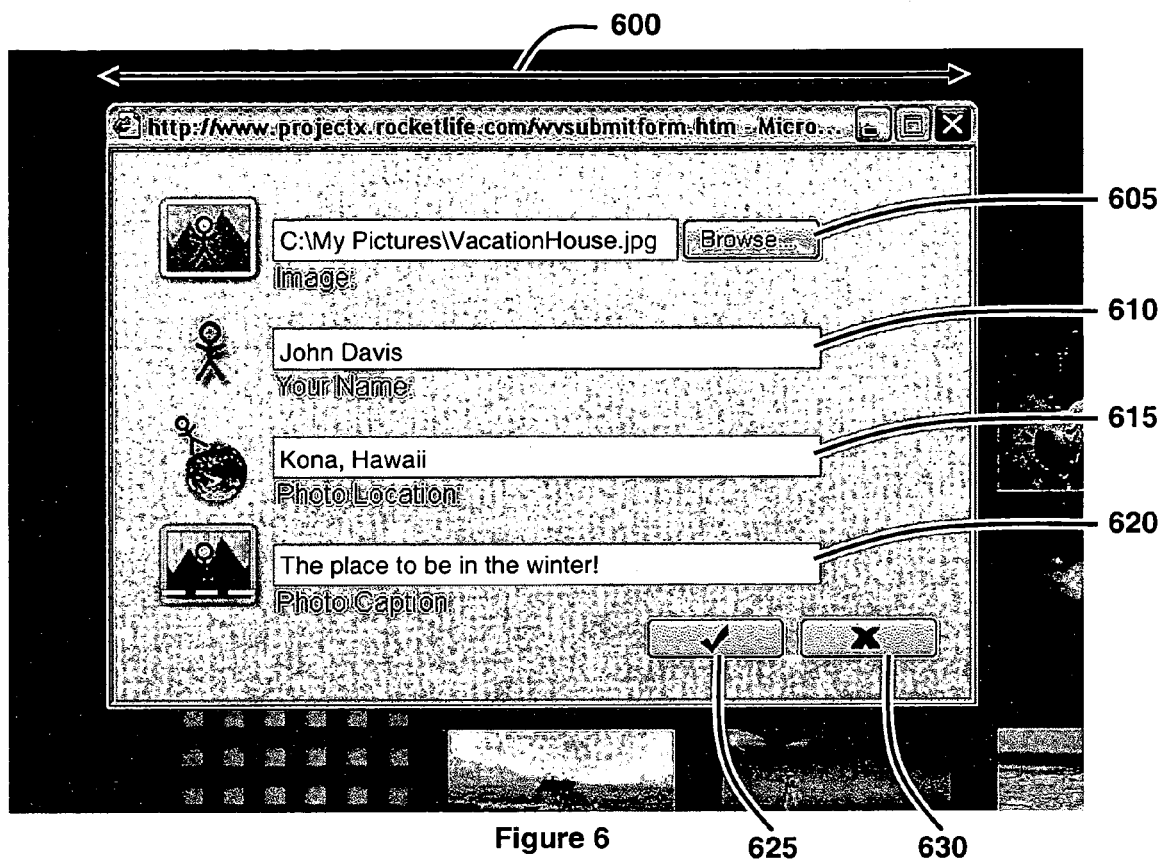
FIG. 6 shows a dynamic interactive graphical user interface for the uploading of a digital image and information about the digital image to a server.

In exemplary embodiments, the dynamic interactive graphical user interface for the uploading of a digital image and associated information or metadata 600 as more fully described herein in connection with FIG. 6, is responsible for the uploading of data and digital images to the server 102. A digital image uploaded to the server 102 is processed by the server 102 to create a digital image 120 that is appropriate for display on a wide variety of display devices 115. Processing by the server 102 includes, when appropriate, digital image size reduction, digital image compression and the addition of aesthetic embellishments such as frame borders and drop shadows. Digital image scaling can also be performed on the client 110 through the use of a browser plug-in software module such as an Active-X™ control, prior to uploading digital images to the server 102.

In exemplary embodiments, a central database server 113, such as an SQL server, can store the information or metadata about digital images uploaded to the server 102. The central database server 113 can store information or metadata including a list of certain digital images with file locations; the identity of the client user who provided a particular digital image; the last time a particular digital image was displayed; the categories of digital images selected or entered at the time a particular digital image was submitted or uploaded to the server by a client user; comments by the submitters of particular digital images; information including comments and feedback about particular digital images as entered by the client users after viewing the particular digital images; voting statistics of client users for or against particular digital images; voting history for particular digital images; and timestamps for the above categories. Using this information or metadata, the server 102 can be programmed to determine when and to whom the server 102 should send a particular digital image. The server 102 can also be programmed for certain information or metadata to be displayed adjacent to or overlaid on top of a particular digital image 120 when the client user is employing a mouse, cursor, or other pointing or selection device 125 by clicking on or hovering over the particular digital image 120.

In exemplary embodiments, a client user can use a dynamic interactive graphical user interface to convey information to the server 102 about the client user's response to a particular digital image or group of digital images. Using a dynamic interactive graphical user interface, the client user can communicate to the server 102 a preference for the frequency the client user wishes to view a particular digital image or group of digital images. Alternatively, the client user may wish to ban a digital image from appearing in the future on the display device 115 of the client 110. Client user information sent to the server 102 can be added to the central database server 113 and used to determine which digital images are to be sent to particular clients for display or to increase or decrease the frequency of display of digital images to all viewers of a selected channel.

In exemplary embodiments, server specialization may be used to perform what is known as "channel feeding" or the mass communication of a particular digital image or group of digital images by a dedicated server or servers to a large number of clients, all of whom share a particular interest or set of interests. Channel feeding is a method for scaling server load and increasing system performance, including search performance. Channel feeding is based on the analysis of client demand for certain content by the identification and/or location of the server for that particular content and using the results of this analysis to direct clients to designated servers, in order to optimize client demand across available server resources. Accordingly, less popular channels will be served with multiple channels per server, while more popular channels will be served with fewer channels per server and/or one or more dedicated servers.

The exemplary architecture 100 as shown in FIG. 1 and the exemplary embodiments and features described herein function to allow: (i) a client user to receive and view digital images in response to information received by the server about the client user on such topics as politics, personal interests, geographic location, family or other interests; (ii) a client user to receive and view digital images in response to information or metadata on the server about the client user such as the digital images previously submitted by the client user; and (iii) a client user to receive and view digital images in response to information or metadata on the server about the client user such as the digital images shared with others by the client user.

Figure 2:
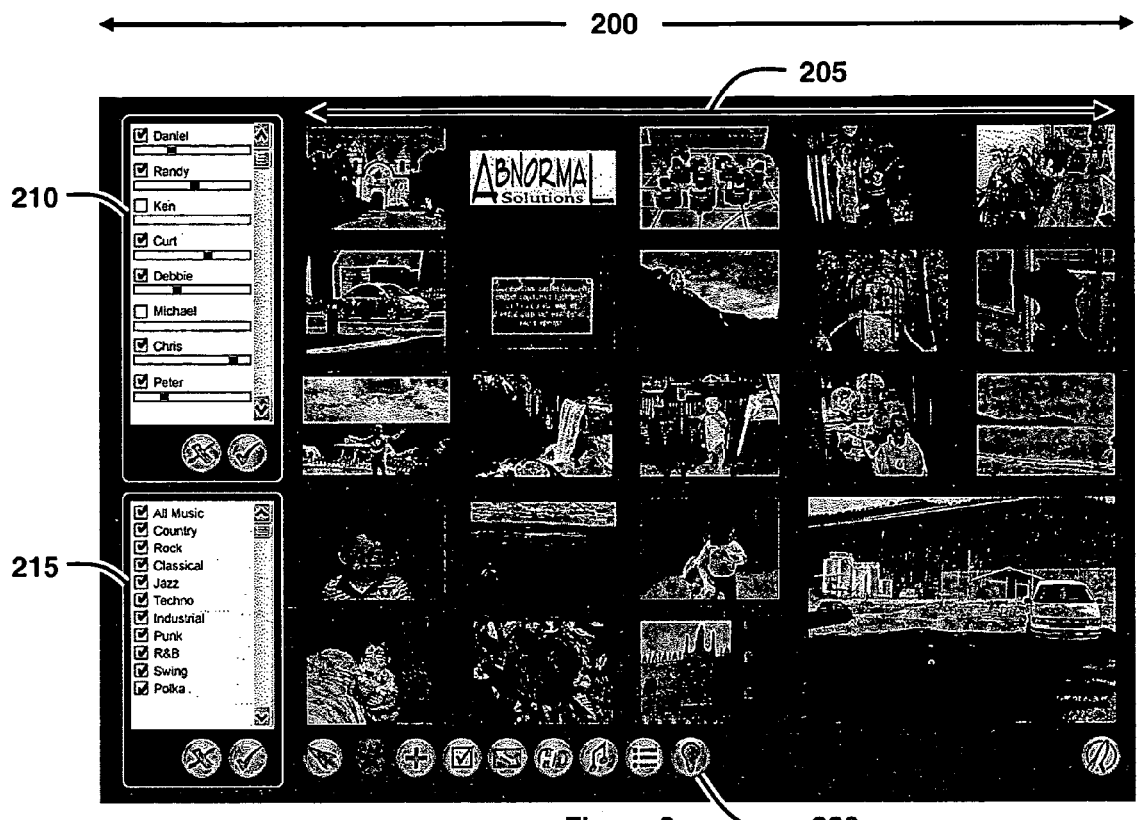
FIG. 2 shows a single screen view of a dynamic interactive graphical user interface of a grid presentation of digital images, a filter or menu for selecting to view digital images from a particular submitter or provider of digital images, a filter or menu for the selection of music to accompany a display of digital images and dynamic interactive graphical user interface buttons.

FIG. 2 shows a screenshot of a dynamic interactive graphical user interface 200 as used in exemplary embodiments. Shown is a grid presentation of digital images 205, a filter control menu for selecting to view digital images based on the submitter or provider of the digital images 210, a filter or menu for the selection of music to accompany a display of digital images 215, and dynamic interactive graphical user interface buttons 220. The functions of the specific dynamic interactive graphical user interface buttons are more fully described herein in connection with FIG. 3.

In exemplary embodiments of the present invention, a grid presentation of digital images 205 is shown on the display device 115 of the client 110. The filter or menu for selecting to view digital images based on the submitter or provider of the digital images 210, allows the client user to select grid presentations of digital images from other specific client users. In the filter control menu 210, a checkbox and a slider control is associated with each digital image provider on the selected channel. The checkboxes can be used to activate or deactivate the display of digital images from each desired provider, and the slider control associated with each provider can be used to indicate the desired frequency that digital images from that provider should be displayed relative to all other providers. The numerical value of all sliders added together is assigned the value of 100%, and then the relative value of each provider's slider position is used to determine the relative percentage of overall digital images displayed that will come from that provider.

Other filters or menus for selecting digital images to create a grid presentation of digital images 205, can include dynamic interactive graphical user interfaces featuring a scalable map or three-dimensional globe to allow a client user to select one or more digital images from or based on a particular part of the world or geographical sub-region. Additionally, a client user can indicate a preference for a particular digital image or group of digital images for display by reviewing a list of digital image identifiers and selecting the corresponding digital images. For example, a client user can review a list of digital image identifiers such as the "Johnson Family" or "Firefighters" and select the corresponding digital images for viewing. Alternatively, the client user can elect to allow the client application 112 to automatically query the server 102 to determine whether there are new digital images of one or more particular categories for viewing.

In exemplary embodiments, a dynamic interactive graphical user interface can also be used for "ghosting" queries, wherein the digital image preferences of a particular client user are matched by the server 102 with the digital image preferences of other client users, resulting in the display of digital images based on shared interests. As a particular client user selects from digital images of interest, the client user is matched by the server 102 with other client users who selected many of the same digital images of interest. A set or group of client users with shared digital image interests can be constructed by the server 102, resulting in the server 102 being able to identify and direct particular digital images pertaining to a particular shared interest to the clients of the corresponding set or group that have not previously viewed the particular digital images.

Exemplary embodiments of the present invention also include a filter or menu for the selection of music to accompany a display of digital images. Using the filter or menu for the selection of music to accompany a display of digital images 215, the client user can select one or more music genres to accompany a presentation of digital images such as shown in 400 (FIG. 4).

Figure 3:
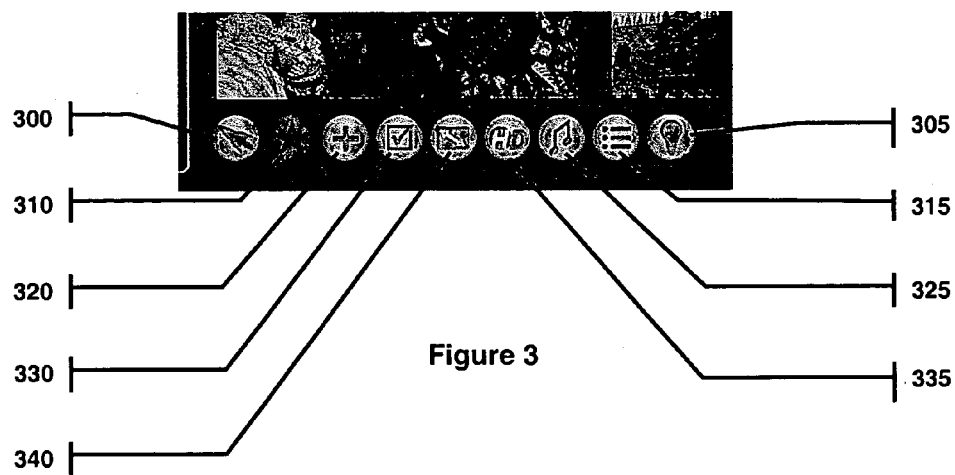
FIG. 3 shows a detail view of the dynamic interactive graphical user interface buttons.

FIG. 3 shows dynamic interactive graphical user interface buttons, as used in exemplary embodiments. Dynamic interactive graphical user interface buttons allow a client user to perform such functions as the: (i) switching of a grid presentation of digital images 205 (FIG. 2) to a slide show presentation of one or more digital images 400 (FIG. 4) 300; (ii) opening the hints and tips panel 305; (iii) viewing of digital images predetermined to be the favorites of the client user 310; (iv) opening the manual settings panel 315; (v) adding or uploading to the server new digital images to the existing presentation 320; (vi) opening of the music genre panel 325; (vii) opening of manual filtering or menu controls 330; (viii) switching from a standard view to a high definition view 335; and (ix) activating a full screen display 340.

Figure 4:
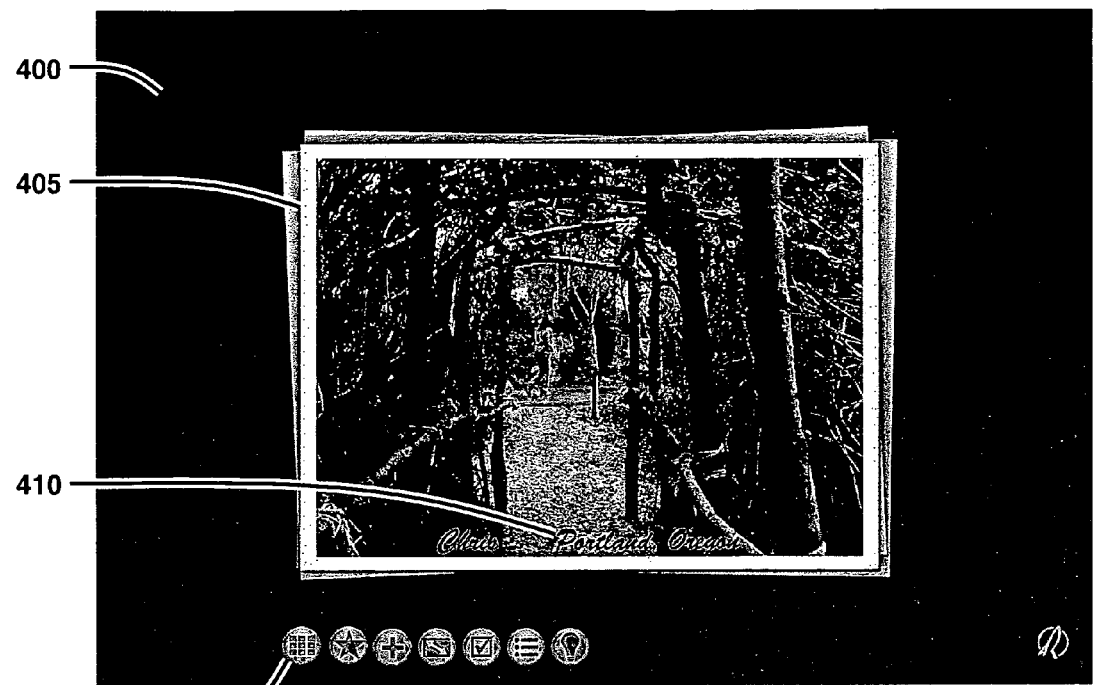
FIG. 4 shows a single slide of a slide show featuring thematic borders and text captions and interactive graphical user interface buttons.

FIG. 4 is a view from an exemplary embodiment of a slide show presentation of one or more digital images 400, thematic borders 405, text captions 410 and dynamic interactive graphical user interface buttons 415. The functions of the dynamic interactive graphical user interface buttons are more fully described herein in connection with FIG. 3.

In exemplary embodiments, a client user can create a custom presentation of digital images appearing in a slide show presentation of one or more digital images 400 by clicking on or otherwise selecting the desired digital images in the grid presentation of digital images 205. Selected digital images will be tagged in the central database server 113 in the order selected by the client user and this data can be used to determine the order in which the digital images will appear during the presentation. The client user can then present the selected digital images in a slide show presentation of one or more digital images 400 by selecting dynamic interactive graphical user interface button 300.

Figure 5:
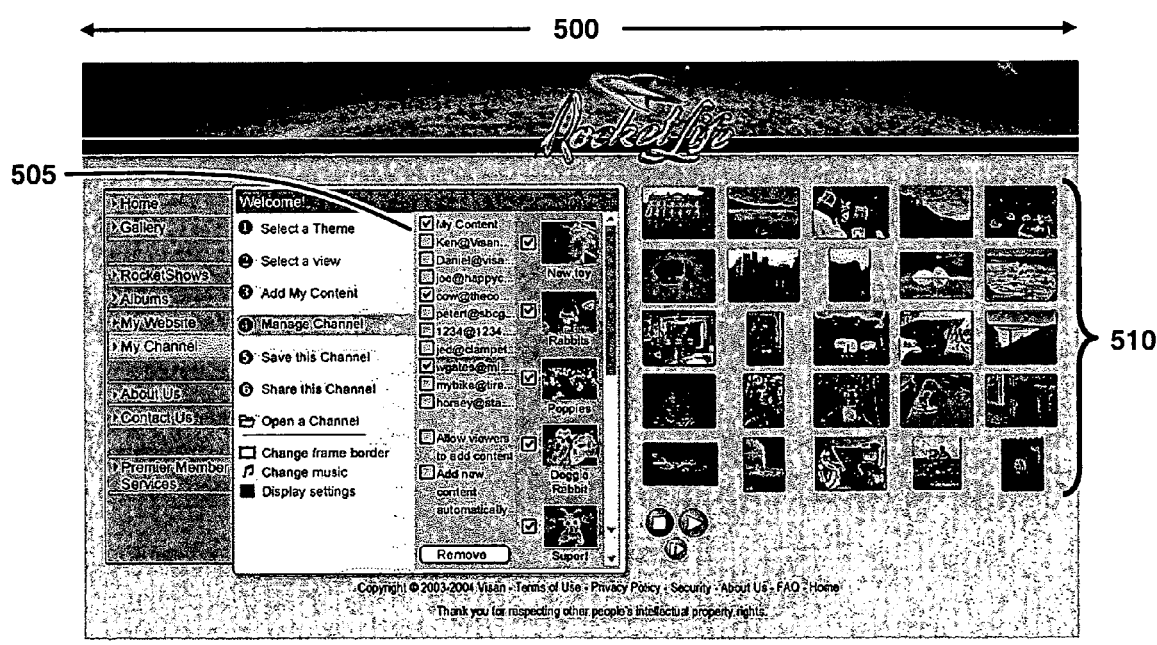
FIG. 5 shows a dynamic interactive graphical user interface with channel controls for changing filter settings.

FIG. 5 is a view from an exemplary embodiment of a dynamic interactive graphical user interface 500, with channel controls for changing filter settings 505. The channel controls for changing filter settings 505 allows a client user to select a particular client user or group of client users using checkboxes to receive and view a particular collection of digital images, displayed in the grid presentation of digital images 510. This feature, known as channeling, allows a client user to create and share a collection of digital images with a group of other client users. This dynamic interactive graphical user interface could also incorporate slider controls to indicate desired image frequency from each provider as depicted in 210 (FIG. 2).

FIG. 6 illustrates from an exemplary embodiment a dynamic interactive graphical user interface for the uploading of a digital image and the information or metadata associated with that particular digital image, which can be implemented in the form of a pop-up window as depicted in 600 or integrated as a panel on the dynamic interactive graphical user interface 200. The dynamic interactive graphical user interface for the uploading of a digital image and associated information or metadata about the digital image 600 can be accessed by the dynamic graphical user interface button 320. A client user can select the browse button 605 or manually type an image file path into the associated text box, allowing the client user to select from the client 110 a digital image 120 for uploading to the server 102. The client user can then enter information or metadata about the particular digital image for uploading to the server 102, including the name of the submitter of the digital image 610, the location where the photo was taken 615 and the photo caption 620. Finally, the client user can select the check box 625 to upload the digital image and associated information or metadata. The uploaded digital image can appear on the display device 115 of a client 110 in a relatively short period of time after the client user selects the check box 625. Alternatively, the client user may select the reject box 630 to abort the upload process.

In exemplary embodiments, the dynamic interactive graphical user interface for the uploading of a digital image and associated information or metadata about the digital image 600 is intended to increase the involvement of client users by the ease in which a client user can upload a digital image 120 to the server 102. Additionally, the relatively short period of time in which it takes for a digital image 120 to appear as part of a grid presentation of digital images 205 after it is uploaded to the server 102 is intended to increase the involvement of client users.

On personal computers, the dynamic interactive graphical user interface for the uploading of a digital image and associated information or metadata about the digital image 600 can be implemented using HTML and Javascript™ and upload the digital image using HTTP protocol, which method can only support the selection for uploading to the server 102 of one digital image at a time. Alternatively, the dynamic interactive graphical user interface for the uploading of a digital image and associated information or metadata about the digital image 600 can be based on a plug-in or custom application such as ActiveX™ control that can be used to support the selection and uploading of multiple digital images. The same ActiveX™ control can also be implemented to support scaling of the digital images on the client 110 to a size more suitable for uploading to the server 102.

Embodiments of the present invention may be used for many purposes. Client users may indicate a personal preference for the increased or decreased viewing of particular digital images. These preferences or votes can be sent to the server and added to the database. Accumulated vote statistics can be used to determine which digital images are to be displayed in the future. Other embodiments of the present invention may be used for such purposes as the: (i) streamlined judging of digital images; (ii) independent authority management; (iii) contestant eligibility protection; (iv) generating user-based participation; and (v) generating feedback on the herein described method and system for the dynamic interactive display of digital images. Other embodiments of the present invention may be used for training based on the present invention's ability to generate timely feedback. Additionally, the present invention may be used for discussion and feedback forums branched off particular digital image categories.

The present invention is described herein with reference to exemplary embodiments. It will be apparent to those skilled in the art that various modifications may be made and other embodiments can be used without departing from the broader scope of the present invention. Therefore, these and other variations of the exemplary embodiments are intended to be covered by the present invention.

What is claimed:

1. A method for the dynamic interactive display of digital images comprising:
   choosing with a client configured with a first dynamic interactive graphical user interface to upload a digital image to a server;
   uploading with the client configured with a second dynamic interactive graphical user interface the digital image to the server;
   selecting with the client configured with the first dynamic interactive graphical user interface more than one digital image from the server, including the uploaded digital image;
   creating with the client configured with the first dynamic interactive graphical user interface a display channel on the server featuring the selected digital images; and
   channeling with the client configured with a third dynamic interactive graphical user interface the display featuring the selected digital images to at least one other client, wherein the channeling is time-synchronized to the at least one other client, and wherein the time-synchronization is achieved by a feedback mechanism from the server to instruct the at least one other client when to automatically make future image requests and update the display.

2. The method for the dynamic interactive display of digital images of claim 1, wherein the display is a slide show.

3. The method for the dynamic interactive display of digital images of claim 1, wherein the display is a slide show with thematic borders.

4. The method for the dynamic interactive display of digital images of claim 1, wherein the display is a slide show with text captions.

5. The method for the dynamic interactive display of digital images of claim 1, wherein the uploaded digital image is a photograph.

6. The method of claim 1, the method further comprising: receiving input from a user to effect a display of an image.

7. The method of claim 6, wherein the effect is to change a relative size of the image.

8. The method of claim 6, wherein the effect is to change a placement of the image.

9. The method of claim 6, wherein the effect is to change a frequency of recurrence of the display of the image.

10. The method of claim 6, wherein the effect is to ban an entire display of the image.

11. The method of claim 6, wherein the input comprises a received vote on the display of the image.

12. The method of claim 6, wherein the input comprises metadata about a client user.

13. The method of claim 12, wherein the metadata includes the client user's preferences on topics or interests.

14. The method of claim 12, wherein the metadata includes data from images previously submitted by the client user.

15. The method of claim 1, the method further comprising: controlling a display of a group of images.

16. The method of claim 15, wherein the display of the group of images is controlled via a set of checkboxes to select or deselect a particular client user or group of client users to provide an image for the display.

17. The method of claim 15, wherein the display of the group of images is controlled via a slider or a knob to select a percentage for which an image is received from any particular client user for the display of the group of images.

18. The method of claim 17, wherein a sum of percentages totals one-hundred.

19. The method of claim 1, wherein the channeling is optimized by analyzing aggregate client demand for certain channels and using results of the analysis to spread image requests across additional servers as needed.

20. The method of claim 1, wherein the display is a dynamic display of a grid of images on a display device of the client.

21. The method of claim 1, wherein the display is a dynamic display comprising a sequential presentation of the images on the display device of the client.

22. The method of claim 21, wherein the sequential presentation is generated by selecting the images from a grid of images on the display device of the client in a desired order of presentation.

23. A system for the dynamic interactive display of digital images comprising:
a display;
a client with a first dynamic interactive graphical user interface configured to allow for the uploading of a digital image to a server;
the client with a second dynamic interactive graphical user interface configured to upload the digital image to the server;
the client with the first dynamic interactive graphical user interface configured to select more than one digital image from the server, including the uploaded digital image;
the client with the first dynamic interactive graphical user interface configured to create a display channel on the server featuring the selected digital images; and
the client with a third dynamic interactive graphical user interface configured to channel the display featuring the selected digital images to at least one other client, wherein the channeling is time-synchronized to the at least one other client, and wherein the time-synchronization is achieved by a feedback mechanism from the server to instruct the at least one other client when to automatically make future image requests and update the display.

24. The system for the dynamic interactive display of digital images of claim 23, wherein the created display is a slide show.

25. The system for the dynamic interactive display of digital images of claim 23, wherein the created display is a slide show with thematic borders.

26. The system for the dynamic interactive display of digital images of claim 23, wherein the created display is a slide show with text captions.

27. The system for the dynamic interactive display of digital images of claim 23, wherein the display is channeled over the Internet.

28. The system for the dynamic interactive display of digital images of claim 23, wherein the uploaded digital image is a photograph.

29. The system for the dynamic interactive display of digital images of claim 23, wherein the first, second and third dynamic interactive graphical user interfaces comprise a client-server application.

30. A system for the dynamic interactive display of digital images comprising:
a display;
a server configured for uploading a digital image from a client;
the server configured for selection by the client of more than one digital image including the uploaded digital image;
the server configured for creation by the client of a display channel on the server featuring the selected plurality of digital images; and
the server configured for channeling by the client of the selected digital images to at least one other client, wherein the channeling is time-synchronized to the at least one other client, and wherein the time-synchronization is achieved by a feedback mechanism from the server to instruct the at least one other client when to automatically make future image requests and update the display.

31. The system for the dynamic interactive display of digital images of claim 30, wherein the server is configured for addition by the client of text captions to the display.

32. The system for the dynamic interactive display of digital images of claim 30, wherein the server is configured for addition by the client of thematic borders to the display.

33. The system for the dynamic interactive display of digital images of claim 30, wherein the server is configured for channeling by the client over the Internet.

34. The system for the dynamic interactive display of digital images of claim 30, wherein the server is configured to function in coordination with an application on the client.

* * * * *